(12) United States Patent
Rothenbuhler et al.

(10) Patent No.: US 11,176,260 B2
(45) Date of Patent: Nov. 16, 2021

(54) PRINT JOB INITIATION BASED UPON DIRECTION OF USER MOVEMENT

(71) Applicant: Hewlett-Packard Development Company, L.P., Spring, TX (US)

(72) Inventors: Dan Rothenbuhler, Boise, ID (US); Dean Richtsmeier, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/631,219

(22) PCT Filed: Jul. 26, 2017

(86) PCT No.: PCT/US2017/044022
§ 371 (c)(1),
(2) Date: Jan. 15, 2020

(87) PCT Pub. No.: WO2019/022734
PCT Pub. Date: Jan. 31, 2019

(65) Prior Publication Data
US 2020/0218814 A1 Jul. 9, 2020

(51) Int. Cl.
*G06F 21/60* (2013.01)
*G06F 3/12* (2006.01)

(52) U.S. Cl.
CPC .......... *G06F 21/608* (2013.01); *G06F 3/1222* (2013.01); *G06F 3/1238* (2013.01); *G06F 3/1267* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 7,187,462 B2 | 3/2007 | Oakeson et al. | |
| 9,612,777 B2 | 4/2017 | Kim et al. | |
| 2003/0202100 A1* | 10/2003 | Prenn | H04N 7/183 348/155 |
| 2013/0149019 A1 | 6/2013 | Sugimura | |
| 2014/0070002 A1 | 3/2014 | Pineau et al. | |
| 2014/0114782 A1 | 4/2014 | Cloin et al. | |
| 2015/0277806 A1* | 10/2015 | Shibata | G06F 3/1268 358/1.14 |
| 2016/0378410 A1 | 12/2016 | Inoue et al. | |
| 2017/0039007 A1 | 2/2017 | Nathani et al. | |
| 2018/0004463 A1* | 1/2018 | Masumoto | H04N 1/4406 |

OTHER PUBLICATIONS

Webpage—Secure Print Release and Find-me Printing, 2010 < https://www.papercut.com/ ~ 7 pages.

* cited by examiner

*Primary Examiner* — Frantz Bataille
(74) *Attorney, Agent, or Firm* — Mannava & Kang

(57) ABSTRACT

According to examples, a printer may include a processor and a memory on which is stored machine readable instructions that may cause the processor to access an instruction to print a print job of a user and determine whether the user is moving toward the printer. In response to a determination that the user is moving toward the printer, the instructions may cause the processor to initiate printing of the print job.

15 Claims, 3 Drawing Sheets

PRINT JOB INITIATION BASED UPON DIRECTION OF USER MOVEMENT

BACKGROUND

Printers are often shared by multiple users in office and other environments. The sharing of printers by multiple users often results in wasted print jobs. That is, users often print multiple jobs from their work stations and never pick up the printed materials or the print jobs are lost among other print jobs and have to be reprinted. In addition, the print jobs may be viewed by people for whom the print jobs were not intended. One way to reduce the number of wasted print jobs and the number of unintended access to the print jobs is to implement a pull printing approach. Under the pull printing approach, printing of a user print job is delayed until the printer determines that the user is physically at the printer, for instance, by waiting until the user touches a printer control panel or scans an access badge. At this point, the printer pulls the user's print job from a user workstation or from a server.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
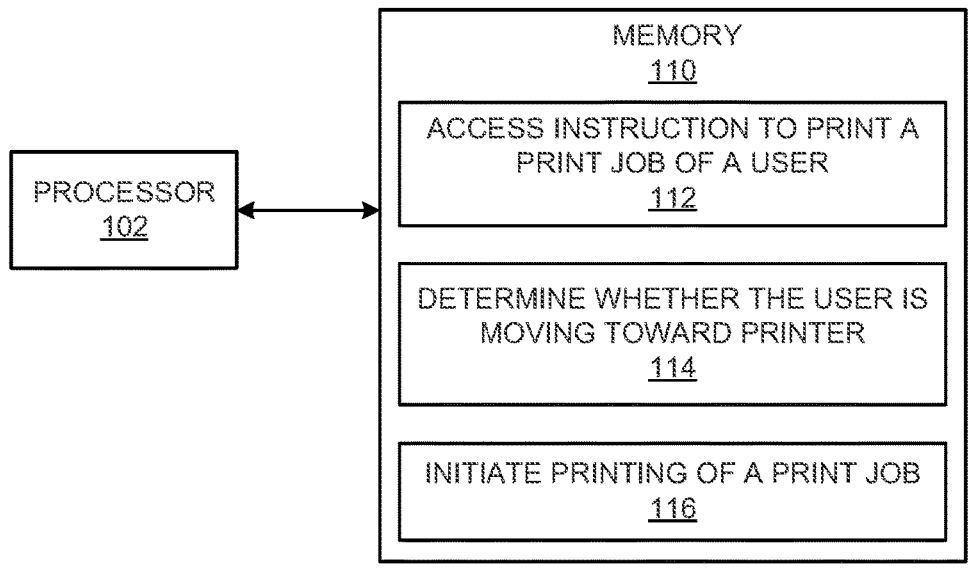
FIGS. 1A and 1B, respectively, show block diagrams of an example printer that may print a user print job in response to a determination that a user is moving toward the printer.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Proximity sensors may be implemented to determine when a user is within a certain distance from a printer and to begin a warm up process when the user is determined to be within the certain distance. Some proximity sensors may also detect if the user is facing the printer. In many instances, the certain distance may be set to a relatively short distance, which may result in the print job not being printed until the user is very close to the printer. This may result in the user having to wait for a relatively long period for time for the print job to be printed. In addition or in other instances, the user may have crossed within the certain distance but may actually be walking away from the printer. In these instances, the printer may print the print job even though the user is not moving toward the printer, which may result in the print job being printed and being lost among print jobs and/or being unintentionally accessible by others.

Moreover, the printer may not begin printing a print job until the printer recognizes the user, e.g., through the user being identified from a password entered on a control panel, through an access badge being scanned, etc. User identification and subsequent printing of the user print job may increase the amount of time required to print a print job. The printing wait time may be reduced through implementation of a facial recognition feature, which may identify the user more quickly than if the user is identified through other credentials.

In contrast to the use of proximity sensors and facial recognition features, the apparatuses and methods disclosed herein may provide for enhanced printing time based on a determination of a user's direction of movement. That is, for instance, a user's print job may be initiated, e.g., the printer may wake from a standby mode, may begin a warm up process, may begin printing the print job, etc., when the user is determined to be moving toward the printer. In addition or in other examples, the printer may initiate printing of a user's print job when the user is determined to be moving toward the printer and the user is within a certain threshold distance from the printer. As disclosed herein, a user distance detection device may detect when a user is within a certain distance from the printer. The user distance detection device may be a device that may detect the user's distance from the printer and a direction of user movement may be determined, for instance, based upon a change in the detected user's distance from the printer over time.

In some examples, the user distance detection device may be implemented on the printer and may be controlled by a processor of the printer. In other examples, the user distance detection device may be connected to the printer and may communicate with the processor of the printer. In either of these examples, the user distance detection device may wirelessly connect to a user mobile device via a Bluetooth™ Low Energy (BLE) connection, although other types of connections may be implemented. The user mobile device may be a smartphone, a tablet computer, a laptop computer, a watch, or the like.

According to examples, the printer may implement a pull printing operation as part of initiating the print job. As discussed above, pull printing may be defined as a printing feature that delays pulling of a user's print job from a server (or a user workstation) until the user is determined to be at or near the printer. In these examples, the user's print job(s) is held on a server (or a user workstation) and released (pulled to the printer) to the printer when the user is determined to be at or near the printer.

According to examples, disclosed herein are apparatuses and methods for delaying printing of a print job until a determination is made that the user that submitted the print job is both within a certain distance of the printer and is moving in a direction toward the printer. When these conditions are met, the printer may initiate printing of the print job, e.g., warm up, pull the print job from a server, print the print job, etc. As such, the print job may not be printed until it is determined that the user is moving toward the printer and is within the certain distance, which may reduce the amount of time that the user may have to wait for the print job to be printed and may minimize print jobs that are printed and not picked up.

In some examples, once the criteria to initiate printing of the print job are met, the printer may send a verification prompt to the user mobile device. The verification prompt may be an interface element displayed on the user mobile device that may ask the user to press a particular button, to enter a PIN or a password, to provide biometric data, or the like. After the printer verifies the user, the printer may present a user with a print menu communicated to the user mobile device and may display, for instance, user print jobs to be selected for printing. Once the user selects the print job(s) from the print menu, the printer may pull the selected job(s) and may initiate printing of the selected job(s). In one example, the printer may communicate an additional print specification menu to the user pertaining to the job to be printed depending on the printer configuration. The print specification menu may include print color, print format, paper type and other printing options that the user may select prior to arrival at the printer such that a user may specify printing options for the print job prior to arriving at the printer. The print specification menu may further include multiple choices of printers from which the user may select a particular printer to print the print job. For instance, different printers may have different capabilities, e.g., color printing, mono color printing, page sizes, etc., and the user may specify which printer they would like to select to print the print job prior to arriving at the printer.

In some examples, user devices and printers may be connected to a print server that maintains a list of users and associated user mobile devices assigned to each user. Each user may have an assigned printer by default based on their location and additional printers may be assigned to a user after the user uses a printer at least once. In addition, the printer disclosed herein may react to a user who has a print job waiting in a print queue such that the print job may be completed by the time the user arrives at the printer.

Figure 1B:
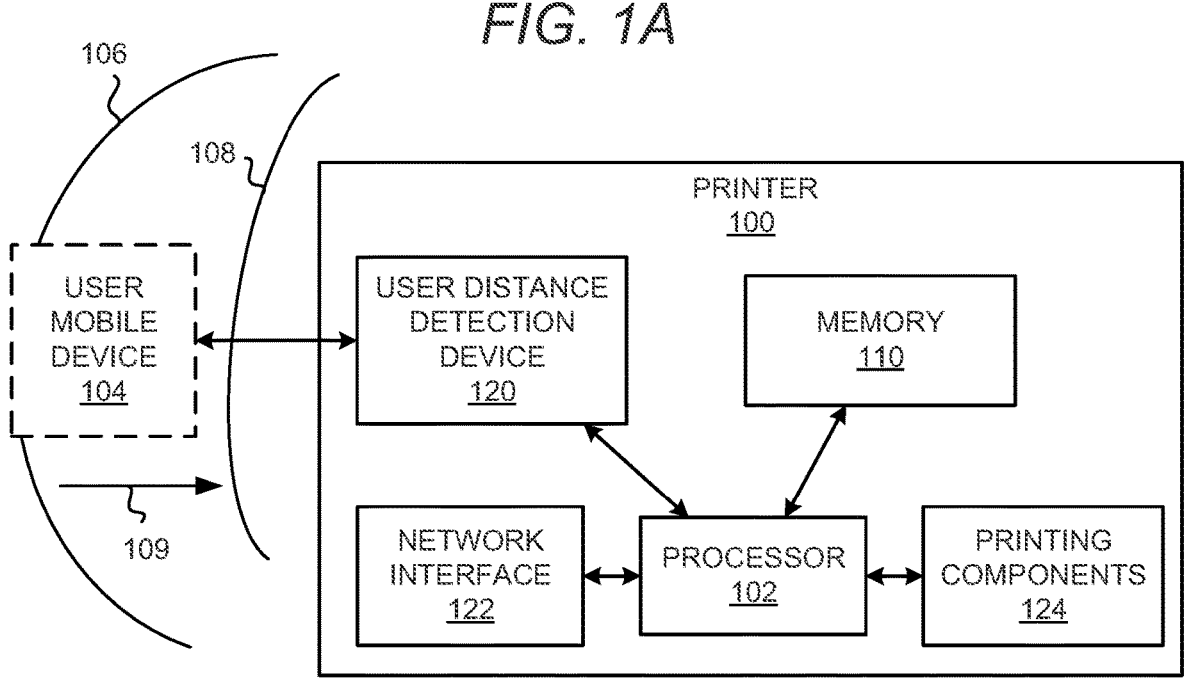

With reference first to FIGS. 1A and 1B, there are respectively shown block diagrams of an example printer 100 that may print a user print job in response to a determination that a user is moving toward the printer 100. It should be understood that the printer 100 depicted in FIGS. 1A and 1B may include additional components and that some of the components described herein may be removed and/or modified without departing from a scope of the printer 100 disclosed herein.

With reference first to FIG. 1A, the printer 100 may include a processor 102 that may control operations of the printer 100. The processor 102 may be a semiconductor-based microprocessor, a central processing unit (CPU), an application specific integrated circuit (ASIC), a field-programmable gate array (FPGA), and/or other hardware device. The printer 100 may also include a memory 110 that may have stored thereon machine readable instructions 112-116 (which may also be termed computer readable instructions) that the processor 102 may execute. The memory 110 may be an electronic, magnetic, optical, or other physical storage device that contains or stores executable instructions.

The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to access an instruction to print a print job of a user. The processor 102 may fetch, decode, and execute the instructions 114 to determine whether the user is moving toward the printer 100. The processor 102 may fetch, decode, and execute the instructions 116 to initiate printing of the print job in response to a determination that the user is moving toward the printer.

With reference now to FIG. 1B, the printer 100 may include a user distance detection device 120, which may communicate with the processor 102. The user distance detection device 120 may be any suitable device that may track the distance of a user mobile device 104 from the printer 100. For instance, the user distance detection device 120 may detect the distance of the user mobile device 104 from the printer 100 through communication with the user mobile device 104 via a wireless communication network, such as a wifi network. By way of particular example, the user mobile device 104 may be equipped with a global positioning system and the user mobile device 104 may communicate the user mobile device 104 location to the user distance detection device 120. The user distance detection device 120 may determine the distance of the user mobile device 104 from the received location.

In some examples, the user distance detection device 120 may track the location of the user mobile device 104 when the user mobile device 104 is within a sufficiently close proximity to the printer 100 such that the user distance detection device 120 directly communicates with the user mobile device 104. For instance, the user distance detection device 120 may be a Bluetooth™ low energy (BLE) device and may communicate directly, e.g., via a Bluetooth™ connection, with the user mobile device 104. That is, the user distance detection device 120 and/or the user mobile device 104 may have a Bluetooth™ beacon that may be used to approximate the distance of the user mobile device 104 with respect to the user distance detection device 120.

In any regard, the user distance detection device 120 may determine the distance at which the user mobile device 104 is approximately located from the user distance detection device 120 and thus the printer 100 through communications with the user mobile device 104. These communications may occur automatically when the user mobile device 104 is within a certain range 106 of the user distance detection device 120. For instance, the user mobile device 104 may have previously paired with the user distance detection device 120. The certain range 106 may be a distance limit to which the user distance detection device 120 may emit a wireless signal, such as a Bluetooth™ signal. Although the user distance detection device 120 has been depicted as being part of the printer 100, the user distance detection 120 may alternatively be located outside of the printer 100 without departing from a scope of the printer 100 disclosed herein.

Once the user distance detection device 120 determines that the user mobile device 104 is within the range 106, the user distance detection device 120 may send a signal to the processor 102 that the user mobile device 104 has been detected. That is, for instance, once the user mobile device 104 wirelessly connects with the user distance detection device 120, the user distance detection device 120 may inform the processor 102 that the user mobile device 104 has been detected. This information may also include an identification of the user mobile device 104, which the processor 102 may use to identify the user of the user mobile device 104. The user distance detection device 120 may also inform the processor 102 of the approximate distance that the user mobile device 104 is away from the printer 100. The processor 102 may track the location of the user mobile device 104 to determine whether the user mobile device 104 is within certain threshold distance 108 from the printer 100. In addition, the processor 102 may track the location of the user mobile device 104 over time to determine if the user mobile device 104 is moving and if so, the direction in which the user mobile device 104 is moving.

As discussed herein, the processor 102 may determine whether a print job of a user of the user mobile device 104 has been accessed, e.g., received, pulled from a server, etc., and if so, may delay printing of the print job until the processor 102 determines that the user mobile device 104 is moving toward the printer 100. In some examples, the printer 100 may delay printing of the print job until the processor 102 also determines that the user mobile device 104 is within the certain threshold distance 108. The certain threshold distance 108 may be defined by a network administrator or other entity and may be defined, for instance, based upon testing or other considerations. In some examples, the certain threshold distance 108 may be set to be similar to the range 106. In addition, it should understood that the range 106 and the certain threshold distance 108 have been depicted along one side of the printer 100 for purposes of illustration and that the range 106 and the threshold distance 108 may instead extend around a periphery of the printer 100.

In addition or in other examples, the processor 102 may delay pulling of the print job from a server (not shown) until the processor 102 determines that the user mobile device 104 is moving toward the printer (or if the user mobile device 104 is both moving toward the printer 100 and within the certain threshold distance 108. In response to a determination the user mobile device 104 is moving toward the printer 100 (or in response to a determination the user mobile device 104 is moving toward the printer 100 and is within the certain threshold distance 108), the processor 102 may pull the print job via a network interface 122. The network interface 122 may be hardware and/or software components that may facilitate communications with servers, clients, or the like. The processor 102 may also store the print job, for instance, in the memory 110, and may control printing components 124 to print the print job. The printing components 124 may include, for instance, mechanisms for feeding media, mechanisms for applying marking material onto the media, mechanisms for drying the marking material, etc.

According to examples, instead of automatically initiating printing, e.g., pulling and/or printing of the print job, in response to the user mobile device 104 being determined to be moving toward the printer 100 (or the user mobile device 104 being determined to be moving toward the printer 100 and being within the certain threshold distance 108), the processor 102 may send a verification prompt to the user mobile device 104. In these examples, the processor 102 may not initiate printing of the print job until the user returns a proper response to the verification prompt. The verification prompt may include a prompt for the user to verify that they would like to initiate printing of the print job. The verification prompt may also, or in other examples, include a prompt for the user to verify the user's identity, for instance, through a password, a biometric scan, or the like. The processor 102 may further send a print menu to the user mobile device 104.

According to examples, the processor 102 may not initiate printing of the user's print job in response to a determination that the user mobile device 104 is within the certain threshold distance 108 but is not determined to be moving toward the printer. Thus, for instance, the processor 102 may only initiate printing of the print job in response to the user mobile device 104 being determined to be moving toward the printer 100.

Figure 2:
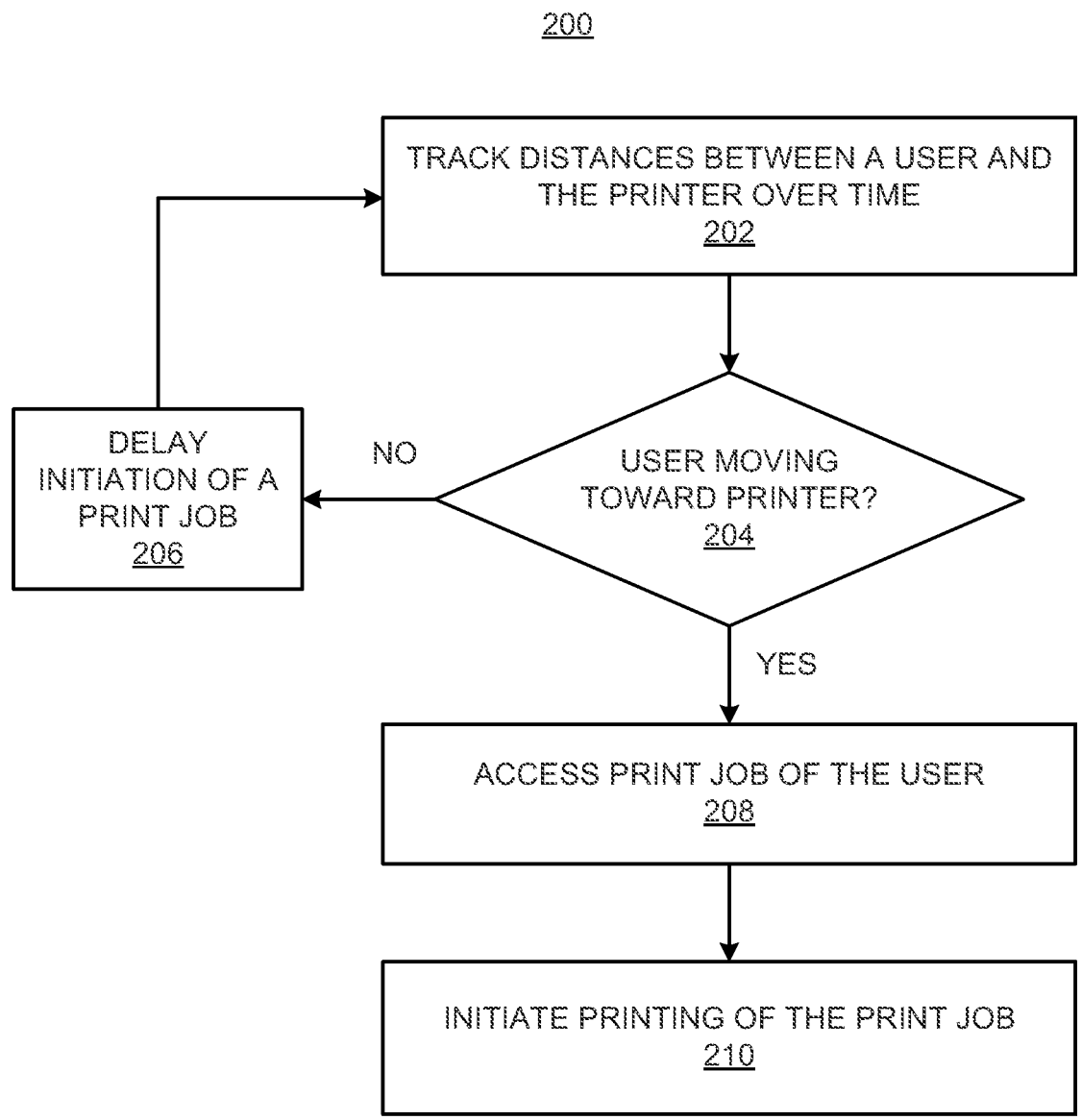
FIG. 2 shows a flow diagram of an example method for initiating a print job based upon a direction of user movement.
Figure 3:
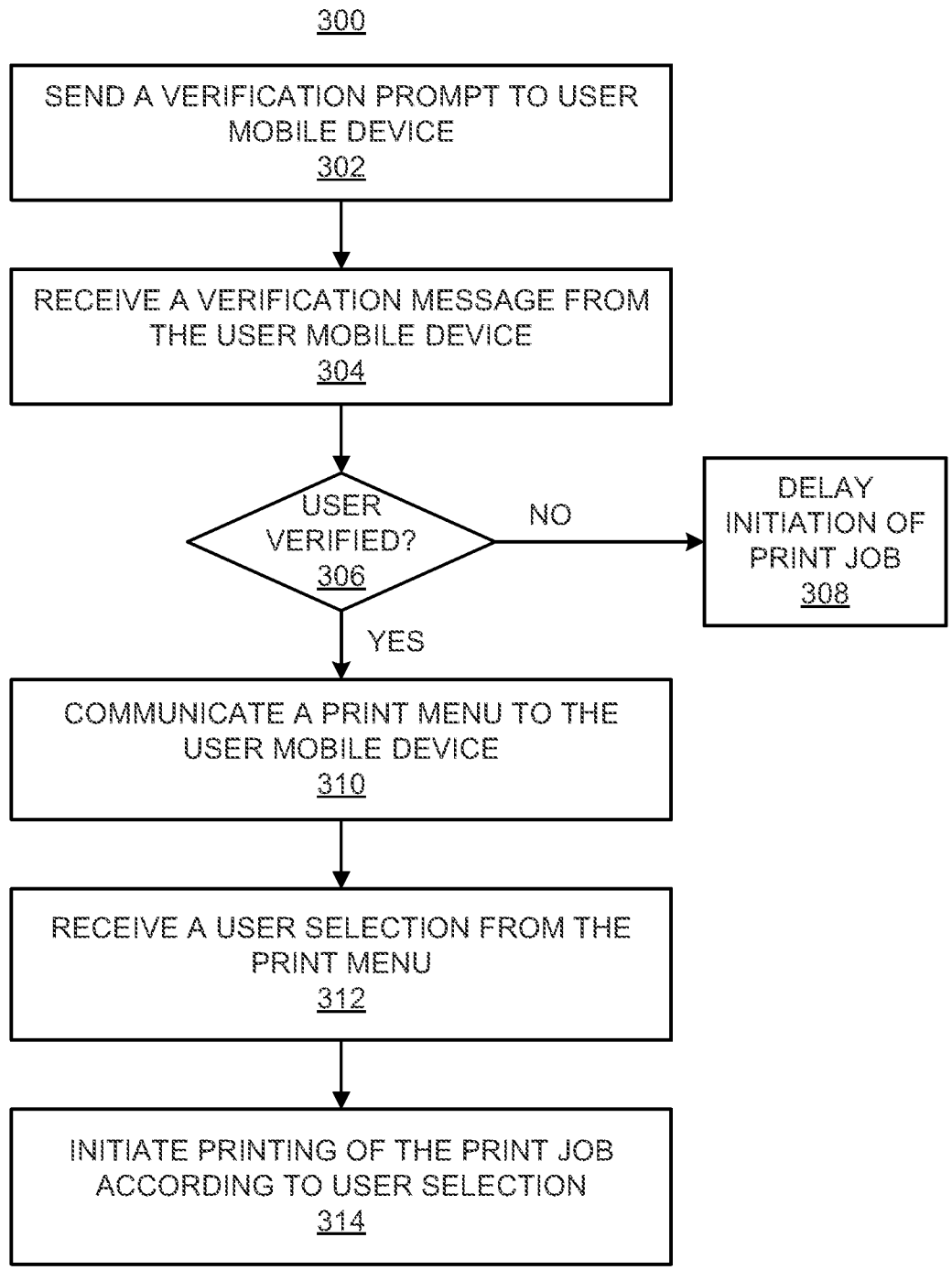
FIG. 3 shows a flow diagram of an example method for managing a user print job in response to a determination that the user is moving toward the printer in FIG. 2.

Various manners in which the printer 100 may be implemented are discussed in greater detail with respect to the methods 200 and 300 depicted in FIGS. 2 and 3. Particularly, FIG. 2 depicts an example method 200 for initiating a print job based upon a direction of user movement and FIG. 3 depicts a flow diagram of an example method for managing a user print job in response to a determination that the user is moving toward the printer 100 at block 204 in FIG. 2. It should be apparent to those of ordinary skill in the art that the methods 200 and 300 may represent generalized illustrations and that other operations may be added or existing operations may be removed, modified, or rearranged without departing from the scopes of the methods 200 and 300.

The descriptions of the methods 200 and 300 are made with reference to the printer 100 illustrated in FIGS. 1A and 1B for purposes of illustration. It should be understood that printers having other configurations may be implemented to perform the methods 200 and 300 without departing from scopes of the methods 200 and 300.

With reference first to FIG. 2, at block 202, the processor 102 may execute the instructions 112 to track distances between a user and the printer 100 over time. The user distance detection device 120 may determine the approximate distance of the user from the printer 100 from communications between the user mobile device 104 and the user distance detection device 120 as discussed above. In addition, the user distance detection device 120 may inform the processor 102 of the detected distance of the user mobile device 104 from the user distance detection device 120. Moreover, the user distance detection device 120 may continue to inform the processor 102 of the detected distance of the user mobile device 104 over time.

At block 204, the processor 102 may execute the instructions 114 to determine whether the user is moving toward the printer 100. That is, for instance, the processor 102 may compare the tracked distances of the user mobile device 104 over time and may determine whether the distances are getting shorter or are getting longer. If the distances are getting longer or are remaining the same, the processor 102 may determine that the user is not moving toward the printer 204. In this case, the processor 102 may delay initiation of the print job as indicated at block 206. In addition, the processor 102 may repeat blocks 202-206 until the processor 102 determines that the user is moving toward the printer 100 at block 204.

In response to a determination at block 204 that the user is moving toward the printer 100, the processor 102 may execute the instructions 112 to access a print job of the user. In other examples, however, the processor 102 may access the print job of the user prior to the user being determined to be moving toward the printer 100. In any regard, and as discussed above, the processor 102 may access the print job from a server or a client via the network interface 122.

At block 210, the processor 102 may initiate printing of the print job. In this regard, the processor 102 may initiate printing of the print job in response to a determination that the user is moving toward the printer at block 204. In addition or in other examples, at block 204, the processor 102 may also determine whether the user mobile device 104 is within the certain threshold distance 108 from the printer 100. In these examples, the processor 102 may delay initiation of the print job unless the processor 102 determines that the user mobile device 104 and thus the user is both moving toward the printer 100 and is within the certain threshold distance 108.

With reference now to FIG. 3, there is shown a flow diagram of a method 300 for managing a user print job in response to determination that the user is moving toward the printer 100 at block 204 in FIG. 2. That is, for instance, the processor 102 may execute the method 300 following a determination at block 204 that the user is moving toward the printer 100 (or that the user is moving toward the printer 100 and is within the certain threshold distance 108) and prior to initiating the printing of the print job 210.

At block 302, in response to a determination that the user is moving toward the printer 100 (or that the user is moving toward the printer 100 and is within the certain threshold distance 108), the processor 102 may send a verification prompt to the user mobile device 102. The processor 102 may send the verification prompt through the connection established by the user distance detection device 120 and/or through the network interface 122. The verification prompt may include instructions or a request for the user to verify the identity of the user, for instance, via a password, via biometric input, via a key card, etc.

At block 304, the processor 102 may receive a verification message from the user mobile device 104. The verification message may include a response to the instructions or request and may thus include information that may be used to verify the identity of the user. At block 306, the processor 102 may determine whether the user is verified from the verification message. In response to a determination that the user is not verified, e.g., the user's credentials do not match stored user credentials, the processor 102 may delay or cease initiation of the print job as indicated at block 308. In addition, the method 300 may end.

However, in response to a determination that the user is verified at block 306, the processor 102 may communicate a print menu to the user mobile device 104, as indicated at block 308. The print menu may include a selection of print jobs to print and/or options for the user to select concerning the printing of the print job, e.g., number of copies, one sided or double sided printing, color printing, a particular printer, or the like.

At block 312, the processor 102 may receive a user selection from the print menu. In addition, at block 314, the processor 102 may initiate printing of the print job according to the received user selection.

Some or all of the operations set forth in the methods 200 and 300 may be contained as utilities, programs, or subprograms, in any desired computer accessible medium. In addition, the methods 200 and 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A printer comprising:
a processor;
a memory storing machine readable instructions that are executable to cause the processor to:
receive an instruction to print a print job from a user;
in response to receiving the instruction to print the print job from the user, detect a distance between the user and the printer over time;
determine whether the user is within a certain threshold distance from the printer based on the distance between the user and the printer;
in response to a determination that the user is within the certain threshold distance from the printer, determine whether the user is moving toward the printer based on a decrease in the distance between the user and the printer over time; and
in response to a determination that the user is both within the certain threshold distance from the printer and is moving toward the printer based on the decrease in the distance between the user and the printer over time, initiate printing of the print job.

2. The printer according to claim 1, wherein to initiate the print job, the instructions are further to cause the processor to pull the print job of the user from a server.

3. The printer according to claim 1, wherein the instructions are further to cause the processor to:
in response to a determination that the user is not moving toward the printer, delay the printing of the print job.

4. The printer according to claim 1, further comprising:
a user distance detection device that is to track the distance between the user and the printer.

5. The printer according to claim 4, wherein the user distance detection device is to communicate wirelessly with a mobile device of the user and to track the distance between the user and the printer based upon wireless communications with the mobile device.

6. The printer according to claim 4, wherein the user distance detection device is to detect the user's presence and to send a wake up command to the processor in response to the user's presence being detected.

7. The printer according to claim 1, wherein the instructions are further to cause the processor to, in response to a determination that the user is both within the certain threshold distance and is moving toward the printer, send a verification prompt to a user mobile device.

8. The printer according to claim 7, wherein the instructions are further to cause the processor to:
receive a verification message from the user mobile device; and
in response to receipt of the verification message,
verify the user; and
communicate a print menu to the user mobile device.

9. The printer according to claim 7, wherein the verification prompt is a request for any of:
a password;
a button press;
a user PIN; and
a user biometric data.

10. A method comprising:
in response to receiving a print job from a user, tracking, by a processor, a distance between the user and a printer over time;
determining, by the processor, whether the user is within a certain threshold distance from the printer based upon the distance between the user and the printer;
in response to a determination that the user is within the certain threshold distance from the printer, determining, by the processor, whether the user is moving toward the printer based upon a decrease in the distance between the user and the printer over time; and
in response to a determination that the user is both within the certain threshold distance and is moving toward the printer based on the decrease in the distance between the user and the printer over time, initiating, by the processor, printing of the print job.

11. The method according to claim 10, further comprising, in response to a determination that the user is both within the certain threshold distance and is moving toward the printer, sending a verification prompt to a mobile device of the user.

12. The method according to claim 11, further comprising:
receiving a verification message from the mobile device of the user;
verifying the user from the received verification message;
in response to the user being verified, communicating a print menu to the mobile device of the user;
receiving a user selection from the print menu; and
initiating the printing of the print job according to the received user selection.

13. The method according to claim 10, further comprising:
in response to a determination that the user is within the certain threshold distance but is not moving toward the printer, delaying printing of the print job.

14. A non-transitory computer readable medium storing machine readable instructions that, when executed by a processor, cause the processor to:
in response to receiving a printing job from a user, track a distance between the user and a printer over time;
determine whether the user is within a certain threshold distance from the printer based upon the distance between the user and the printer;
in response to a determination that the user is within the certain threshold distance from the printer, determine whether the user is moving toward the printer based upon a decrease in the distance between the user and the printer over time;
in response to a determination that the user is both within the certain threshold distance and is moving toward the printer based on the decrease in the distance between the user and the printer over time, initiate printing of the print job; and
in response to a determination that the user is not moving toward the printer, delay initiation of the printing of the print job.

15. The non-transitory computer readable medium according to claim 14, wherein the machine readable instructions are further executable to cause the processor to:
send a verification prompt to a user mobile device;
receive a verification message from the user mobile device;
in response to the user being verified based on the verification message, communicate a print menu to the user mobile device;
receive a user selection from the print menu; and
initiate the printing of the print job according to the received user selection.

* * * * *